United States Patent [19]
Coxum

[11] Patent Number: 5,491,935
[45] Date of Patent: Feb. 20, 1996

[54] ROOF ANCHOR SYSTEM

[76] Inventor: Thomas Coxum, P.O. Box 1152, San Martin, Calif. 95046

[21] Appl. No.: 224,799

[22] Filed: Apr. 8, 1994

[51] Int. Cl.$^6$ ............................................... E04H 9/14
[52] U.S. Cl. ........................... 52/92.2; 52/23; 52/92.1; 52/93.1; 52/223.1; 52/295; 52/105
[58] Field of Search .......................... 52/92.1, 92.2, 52/93.1, 23, 223.1, 223.7, 295, 105; 403/44, 307; 285/175, 93; 411/14, 908, 411

[56] References Cited

U.S. PATENT DOCUMENTS

| | | | |
|---|---|---|---|
| 797,474 | 8/1905 | Walker | 52/93.2 X |
| 1,657,441 | 1/1928 | Huovinen | 52/92.2 X |
| 1,932,554 | 10/1933 | McKee | 52/93.1 |
| 2,100,451 | 11/1937 | Parkhurst | 52/92.2 X |
| 2,665,489 | 1/1954 | Cunningham | 403/44 X |
| 3,330,084 | 7/1967 | Russell | 52/92.2 X |
| 3,707,811 | 1/1973 | Hampson | 52/23 |
| 3,724,151 | 4/1973 | Kaywood et al. | 52/23 X |

FOREIGN PATENT DOCUMENTS 241765  8/1965  Austria .

*Primary Examiner*—Carl D. Friedman
*Assistant Examiner*—Christopher Todd Kent

[57] ABSTRACT

Disclosed is a roof anchor system for preventing lifting of a building roof from the walls by high winds for use in building structures having a roof constructed of wood rafters and joists supported by walls and also having a cast concrete foundation footing with at least one perimetric reinforcing bar therein. The roof rafters and joists are connected to each other and anchored to the foundation for preventing lifting of the roof from the walls during high winds. The roof anchor system comprises a plurality of identical rafter connectors, a connector being attached to every rafter of the roof. A horizontal tie bar extends through all rafter connectors on a side of the building. A plurality of identical metal T-shaped reversible couplings is evenly spaced along the horizontal tie bar and a second plurality of reversible couplings is cast within the concrete foundation footings, each coupling being spaced along the reinforcing bar directly under a corresponding coupling on the horizontal tie bar. A vertical upper tie bar is connected to each of the upper plurality of reversible couplings whereas a vertical lower tie bar is connected to each of the lower plurality of reversible couplings such that the upper ends of the lower tie bars are in spaced facing relationship with the lower ends of corresponding upper tie bars. An adjusting coupling is connected between the facing ends of the upper and lower vertical tie bars whereby the connected-together roof rafters and joists are effectively anchored to the building foundation. Adjusting tension of the pair of vertical tie bars connected by each adjusting coupling may be accomplished by rotating the adjusting coupling.

1 Claim, 4 Drawing Sheets

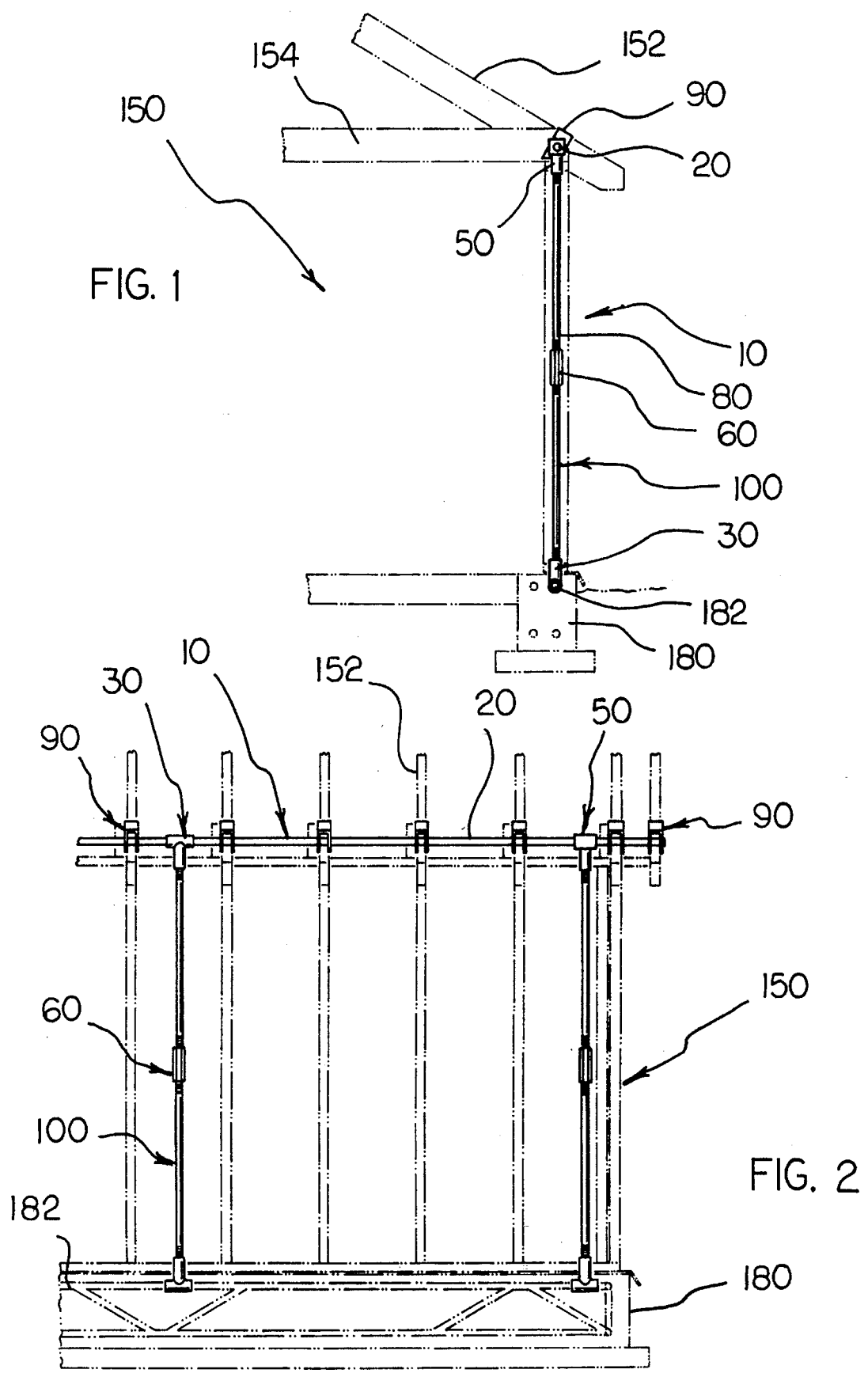

FIG. 5
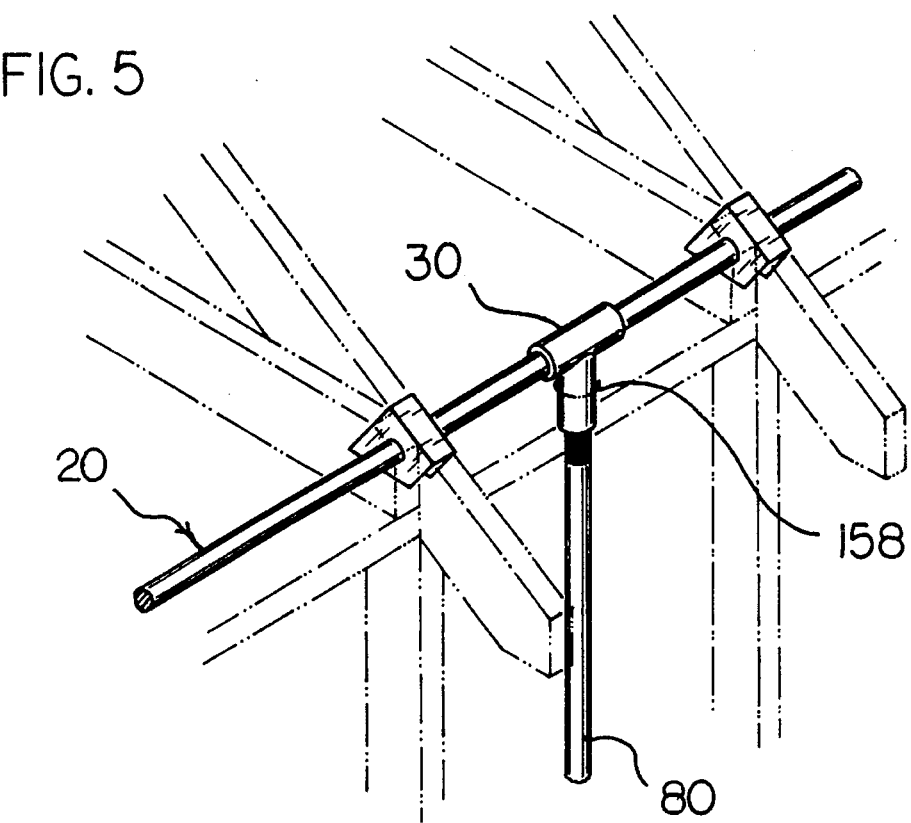
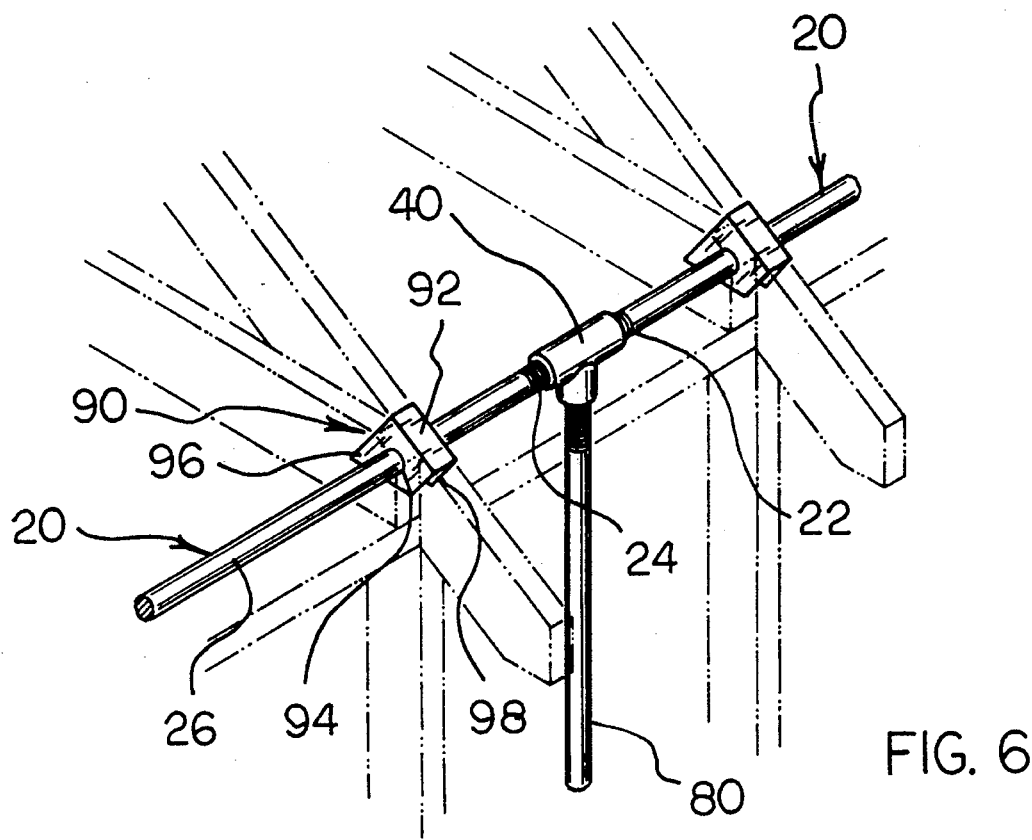
FIG. 6

5,491,935

ROOF ANCHOR SYSTEM

BACKGROUND OF THE INVENTION

1. Field of the Invention

The present invention relates to building wind protection devices and more particularly pertains to a roof anchor system which may be adapted for preventing lifting of a building roof from the walls by high winds.

2. Description of the Prior Art

The use of building wind protection devices is known in the prior art. More specifically, building wind protection devices heretofore devised and utilized for the purpose of protecting buildings against wind damage are known to consist basically of familiar, expected and obvious structural configurations, notwithstanding the myriad of designs encompassed by the crowded prior art which have been developed for the fulfillment of countless objectives and requirements.

The present invention is directed to improving devices for preventing lifting of a building roof from the walls by high winds in a manner which is safe, secure, economical and aesthetically pleasing.

For example, U.S. Pat. No. 4,714,372 to Commins discloses a hurricane tie for connecting wood members in a building structure having a unitary sheet metal body member including a truncated generally right angled triangular base member and a generally tight angled triangular web member arranged in reverse apex order with respect to one another. The base and web members lie in planes which are mutually angularly related to one another. The base and web members are formed with fastener openings for connecting the tie to the wood members.

Other patents of interest include U.S. Pat. No. 4,782,638 to Hovind which describes hurricane protector clips and U.S. Pat. No. 3,919,822 to Martin et al. which shows a roofing panel and assembly and method.

The prior art also discloses a hurricane panel security device as shown in U.S. Pat. No. 4,333,271 to DePaolo et al. and a roof fastener assembly including a dual plate stress reliever of U.S. Pat. No. 5,035,028 to Lemke.

While these devices fulfill their respective, particular objectives and requirements, the aforementioned patents do not disclose a roof anchor system for preventing lifting of a building roof from the walls by high winds.

In this respect, the roof anchor system according to the present invention substantially departs from the conventional concepts and designs of the prior art, and in so doing provides an apparatus primarily developed for the purpose of preventing lifting of a building roof from the walls by high winds.

Therefore, it can be appreciated that there exists a continuing need for a new roof anchor system which can be used for preventing lifting of a building roof from the walls by high winds. In this regard, the present invention substantially fulfills this need.

As illustrated by the background art, efforts are continuously being made in an attempt to develop devices for protecting buildings against wind damage. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of building construction materials now present in the prior art, the present invention provides a new building construction materials construction wherein the same can be utilized for preventing lifting of a building roof from the walls by high winds. As such, the general purpose of the present invention, which will be described subsequently in greater detail, is to provide a new roof anchor system apparatus and method which has all the advantages of the prior art building wind protection devices and none of the disadvantages.

The invention is defined by the appended claims with the specific embodiment shown in the attached drawings. For the purpose of summarizing the invention, the invention may be incorporated into a new roof anchor system for use in building structures having a roof constructed of wood rafters and joists supported by walls and also having a cast concrete foundation footing with at least one perimetric reinforcing bar therein. The roof rafters and joists are connected to each other and anchored to the foundation for preventing lifting of the roof from the walls during high winds. The roof anchor system comprises a plurality of identical rafter connectors whereby every rafter in the roof may be attached to the roof anchor system. A plurality of identical metal T-shaped reversible couplings are included in the system. A lower plurality of evenly spaced apart reversible couplings is cast within the concrete foundation footings, being disposed along the reinforcement bar within the footing. The roof anchor system further comprises a plurality of identical horizontal tie bars. A horizontal tie bar attaches the rafter connectors, roof rafters, and joists together on each side of the building. The horizontal tie bar also retains an upper plurality of evenly spaced apart T-shaped reversible couplings thereon. Each of the upper plurality of reversible couplings is positioned along the horizontal tie bar spaced directly above a corresponding coupling of the lower plurality of T-shaped reversible couplings. In places where the horizontal tie bar is too short to engage all the rafter connectors on a side, a metal T-shaped splicing coupling is used in place of a reversible coupling whereby two horizontal tie bars may be joined for increased length. In places too confined for use of a reversible coupling, such as between closely spaced rafters, a metal T-shaped corner coupling is used in place of a reversible coupling. A vertical upper tie bar is connected to each of the upper plurality of reversible couplings such that the upper tie bars depend downwardly from the reversible couplings. A vertical lower tie bar is connected to each of the lower plurality of reversible couplings of the lower plurality of T-shaped reversible couplings extending from the foundation footing such that the upper ends of the lower tie bars are in spaced facing relationship with the lower ends of corresponding upper tie bars. An adjusting coupling is connected between the facing ends of the upper and lower vertical tie bars whereby the connected-together roof rafters and joists are effectively anchored to the building foundation. The upper end of an adjusting coupling is threadedly engaged with the lower end of each of the vertical upper tie bars, the lower end being threadedly engaged with the upper end of each facing vertical lower tie bars. Adjusting tension of the pair of vertical tie bars connected by each adjusting coupling may be accomplished by rotating the adjusting coupling.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an roof anchor system for preventing lifting of a building roof from the walls by high winds.

It is another object of the present invention to provide a new roof anchor system which may be easily and efficiently manufactured and marketed.

It is a further object of the present invention to provide a new roof anchor system which is of a durable and reliable construction.

An even further object of the present invention is to provide a new roof anchor system which is susceptible of a low cost of manufacture with regard to both materials and labor, and which accordingly is then susceptible of low prices of sale to the consuming public, thereby making such roof anchor systems economically available to the buying public.

Still yet another object of the present invention is to provide a new roof anchor system which provides in the apparatuses and methods of the prior art some of the advantages thereof, while simultaneously overcoming some of the disadvantages normally associated therewith.

Still yet another object of the present invention is to provide a new roof anchor system that effectively protects buildings having gable, hip, and flat roofs.

Yet another object of the present invention is to provide a new roof anchor system that may be readily incorporated into uniform building codes throughout the United States and other countries.

Even still another object of the present invention is to provide a new roof anchor system that will enable a building to withstand dangerous winds generated by hurricanes, tornadoes, and other storms.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the new roof anchor system showing its manner of use as installed on a typical building.

FIG. 2 is a front elevational view of the invention of FIG. 1.

FIG. 5 is a perspective detail view of the present invention showing the manner of use of a reversible coupling as installed on a horizontal tie bar.

FIG. 6 is a perspective detail view of the present invention showing the manner of use of a splicing coupling as installed joining two horizontal tie bars.

DESCRIPTION OF THE PREFERRED EMBODIMENT

Figure 3:
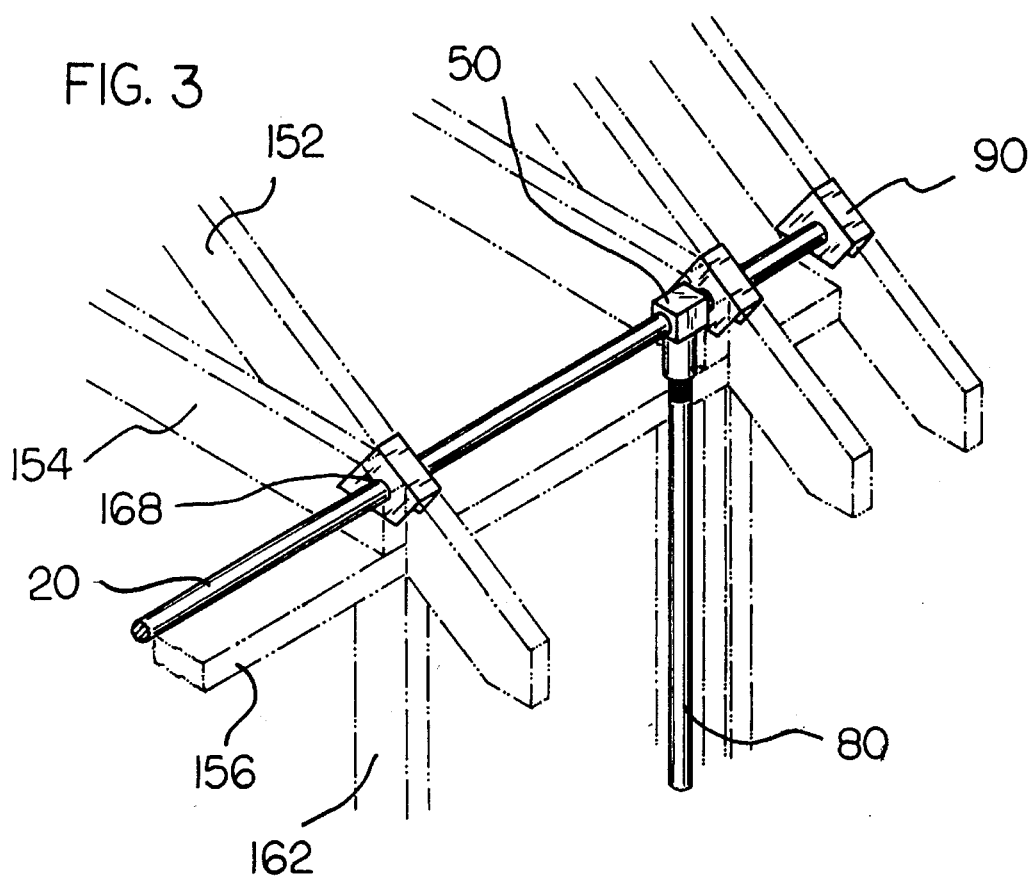
FIG. 3 is a perspective detail view of the present invention illustrating the manner of use of a corner coupling.

With reference now to the drawings, and in particular to FIGS. 1 and 2 thereof, a new roof anchor system embodying the principles and concepts of the present invention and generally designated by the reference numeral 10 will be described.

From an overview standpoint, the roof anchor system is adapted for use in building structures having a roof constructed of wood rafters and joists supported by walls and also having a cast concrete foundation footing with at least one perimetric reinforcing bar therein for preventing lifting of a building roof from the walls by high winds. See FIGS. 1 and 2.

Figure 4:
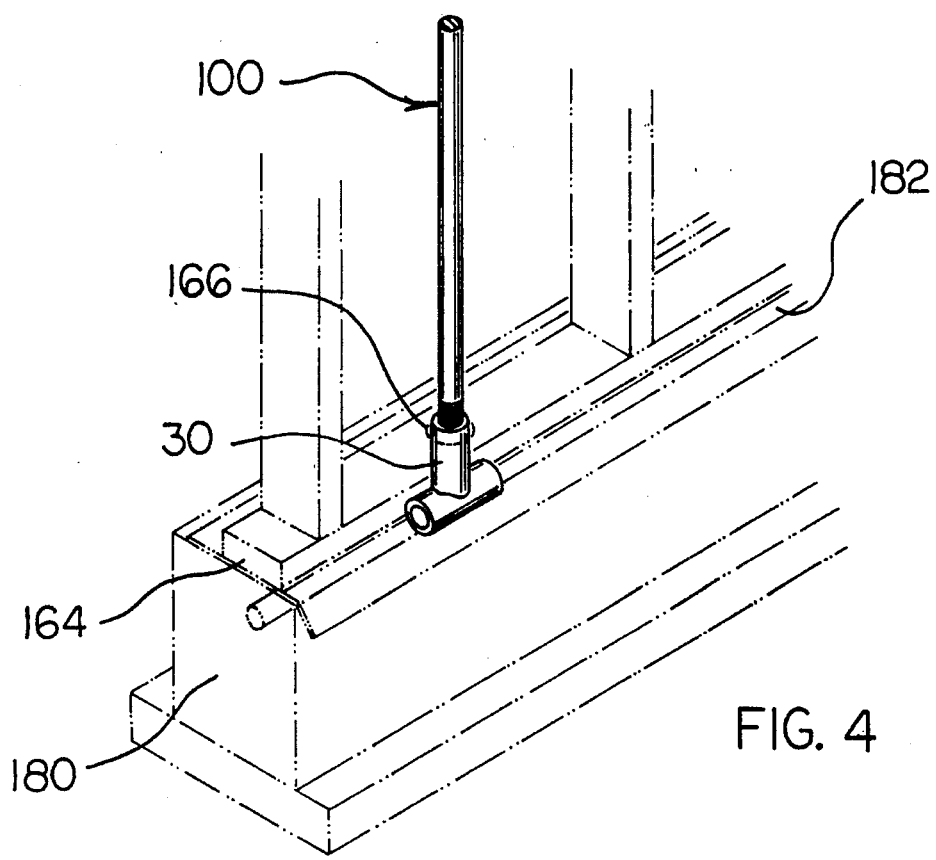
FIG. 4 is a perspective detail view of the present invention showing the manner of use of a reversible coupling as installed on a reinforcing bar within a foundation footing.
Figure 7:
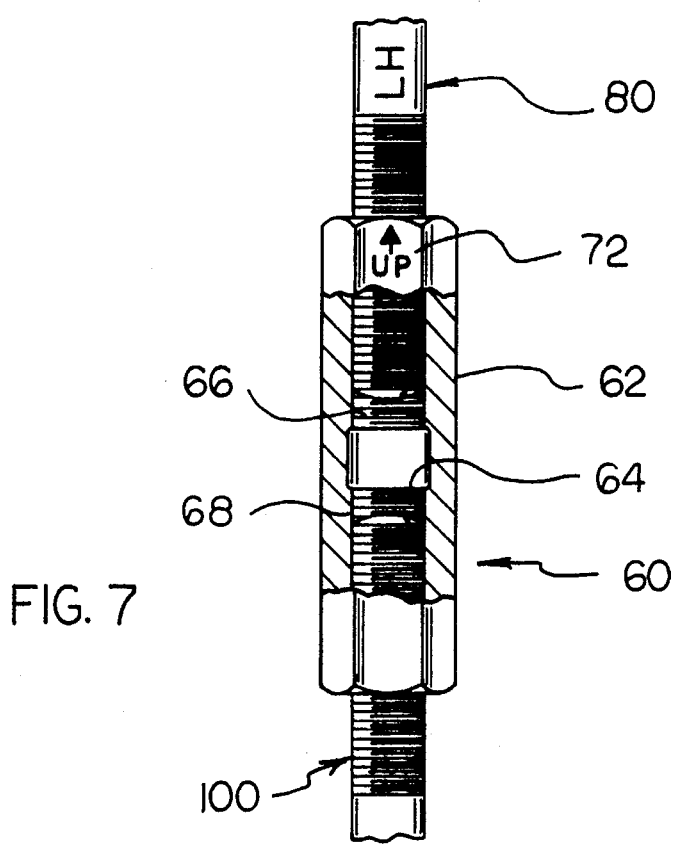
FIG. 7 is a partially cut-away view of an adjusting coupling of the present invention illustrating its manner of use in joining an upper and a lower vertical tie bar.
Figure 8:
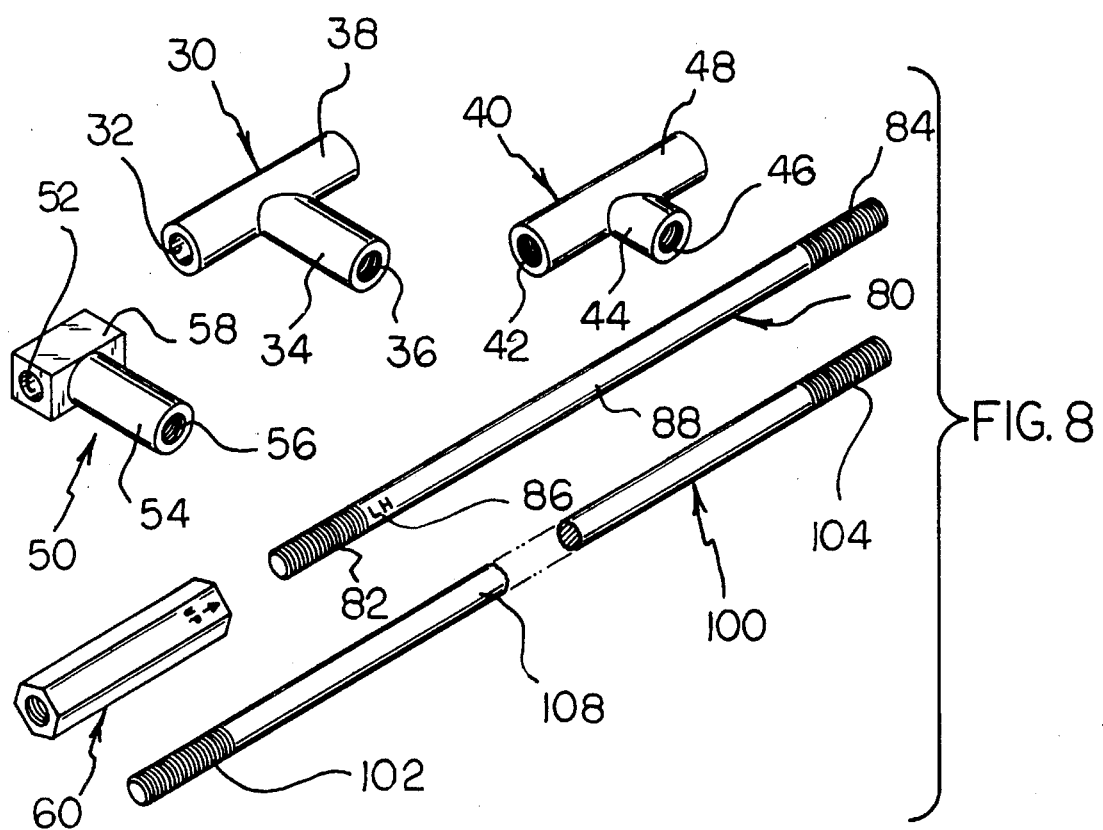
FIG. 8 is a perspective view of a corner coupling, a reversible coupling, a splicing coupling, an adjusting coupling, an upper vertical tie bar, and a lower vertical tie bar of the present invention.

With reference now to FIGS. 1–8 and more specifically, it will be noted that a new roof anchor system 10 is shown. The roof rafters 152 and joists 154 are connected to each other and anchored to the foundation 180 for preventing lifting of the roof from the walls by high winds. The roof anchor system 10 comprises a plurality of identical rafter connectors 90 whereby every rafter 152 in the roof may be attached to the roof anchor system. Each rafter connector 90 comprises a downwardly opening rectangular channel 92 formed of sheet metal. The sides of the channel 96 and 98 have longitudinally, essentially roof pitch complimentary, angled ends formed thereon. The channel 92 also has an essentially central lateral hole 94 through both sides thereof. In use, a connector 90 is placed over each rafter 152, at the point where the rafter overlies the wall 162, such that the channel 90 brackets the top and sides of the rafter 152. A hole 168 is bored through the rafter 152 and if necessary, the adjacent joist 154, the hole 168 being in alignment with the central holes 94 through the sides of the rafter connector 90.

A plurality of identical metal T-shaped reversible couplings are included in the system 10. Each reversible coupling 30 comprises a tubular horizontal member 38 having a smooth bore 32 therethrough. The horizontal member 38 also has an integral vertical tubular member 34 extending therefrom centrally intermediate the ends thereof. The vertical member 34 has a right-hand threaded bore 36 therethrough. In use, a lower plurality of evenly spaced apart reversible couplings 30 is cast within the concrete foundation footings 180. The lower plurality of reversible couplings 30 is disposed along the reinforcement bar 182 within the footing 180 such that the reinforcement bar 182 passes through the smooth bore 32 of the reversible couplings 30 whereby the reversible couplings are retained on the reinforcement bar 182 with the vertical member 34 of the reversible couplings 30 projecting upwardly from the reinforcement bar 182 and extending slightly above the top surface of the footing 180.

The roof anchor system 10 further comprises a plurality of identical horizontal tie bars. Each horizontal tie bar 20 comprises an elongated metal rod 26 having right-hand external threads formed on both ends 22 and 24 thereof. In use, a horizontal tie bar 20 extends through the lateral holes 94 in the rafter connectors 90, roof rafters 152 and joists 154.

The horizontal tie bar 20 also extends through the smooth bores 32 of an upper plurality of evenly spaced apart T-shaped reversible couplings 30 such that the reversible couplings' vertical member 34 depends downwardly therefrom. A clearance hole 158 for the vertical member is bored through the wall top plate 156, if necessary. Each of the upper plurality of reversible couplings 30 is positioned along the horizontal tie bar 20 spaced directly above a corresponding coupling 30 of the lower plurality of T-shaped reversible couplings. In places where the horizontal tie bar 20 is too short to engage all the rafter connectors 90 on a side, a metal T-shaped splicing coupling 40 is used in place of a reversible coupling 30 whereby two horizontal tie bars 20 may be joined for increased length.

Each splicing coupling 40 comprises a tubular horizontal member 48 having a right-hand threaded bore 42 therethrough, the horizontal member 48 also having an integral vertical tubular member 44 extending therefrom centrally intermediate the ends thereof. The vertical member 44 has a right-hand threaded bore 46 therethrough. The splicing coupling horizontal member 48 is threadedly engaged at each end with the threaded end 22 and 24 of a horizontal tie bar 20. In places too confined for use of a reversible coupling 30, such as between closely spaced rafters, a metal T-shaped corner coupling 50 is used in place of a reversible coupling 30. Each corner coupling 50 comprises a short rectangular horizontal member 58 having a smooth bore 52 therethrough. The horizontal member 58 also has an integral vertical tubular member 54 extending therefrom centrally intermediate the ends thereof, the vertical member 54 having a right-hand threaded bore 56 therethrough. The horizontal member 58 of a corner coupling being engaged with a horizontal tie bar 20 such that the tie bar 20 extends through the smooth bore 52 of the corner coupling 50.

A vertical upper tie bar 80 is connected to each of the upper plurality of reversible couplings 30. Each upper tie bar 80 comprises an elongated metal rod 88 having an upper end 84 with right-hand external threads formed thereon and a lower end 82 with left-hand external threads formed thereon. The lower end also has the legend "LH" 86 marked thereon whereby a user may easily recognize the thread orientation of that end. In use, the upper end 84 of an upper tie bar 80 is threadedly engaged with the downwardly depending threaded bore 36 of each of the upper plurality of reversible T-shaped couplings 30 such that the upper tie bars depend downwardly from the reversible couplings.

A vertical lower tie bar 100 is connected to each of the lower plurality of reversible couplings 30. Each lower tie bar 100 comprises an elongated metal rod 108 having right-hand external threads formed on both ends 102 and 104 thereof. In use, the lower end 102 of a lower tie bar 100 is threadedly engaged with the upwardly projecting threaded bore 36 of each of the lower plurality of T-shaped reversible couplings 30 extending from the foundation footing 180 such that the upper ends 104 of the lower tie bars 100 are in spaced facing relationship with the lower ends 82 of corresponding upper tie bars 80.

An adjusting coupling 60 is connected between the facing ends 82 and 104 of the upper and lower vertical tie bars 80 and 100 whereby the connected-together roof rafters 152 and joists 154 are effectively anchored to the building foundation 180. Each adjusting coupling 60 comprises an elongated metal hexagonal nut 62 having an upper end 66 with left-hand internal threads formed therein and a lower end 68 with right-hand internal threads formed therein. The upper end 66 also has the legend "UP↑" 72 marked thereon whereby the user may easily recognize the thread orientation of that end. In use, the upper end 66 of an adjusting coupling is threadedly engaged with the lower end 82 of each of the vertical upper tie bars 80, the lower end 68 being threadedly engaged with the upper end 104 of each facing vertical lower tie bar 100. Adjusting tension of the pair of vertical tie bars 80 and 100 connected by each adjusting coupling 60 may be accomplished by rotating the adjusting coupling 60. Rotating the coupling 60 in one direction relative the vertical tie bars 80 and 100 draws the tie bar ends 82 and 104 closer together for increasing tension on the tie bars whereas rotating the adjusting coupling 60 in the other direction relative the vertical tie bars 80 and 100 forces the tie bar ends 82 and 104 farther apart for decreasing tension on the tie bars 80 and 100.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A roof anchor system for use in building structures having a roof constructed of wood rafters and joists supported by walls and also having a cast concrete foundation footing with at least one perimetric reinforcement bar therein, whereby the roof rafters and joists are connected to each other and anchored to the foundation for preventing lifting of the roof from the walls by high winds, the roof anchor system comprising:

a plurality of identical rafter connectors whereby every rafter in the roof may be attached to the roof anchor system, each rafter connector comprising a downwardly opening rectangular channel formed of sheet metal, the sides of the channel having longitudinally essentially roof pitch complimentary angled ends thereon, the channel also having an essentially central lateral hole through both sides thereof, a rafter connector adapted to be placed over each rafter at the point where the rafter overlies the wall such that the channel brackets the top and sides of the rafter;

a plurality of identical metal T-shaped reversible couplings, each reversible coupling comprising a tubular horizontal member having a smooth bore therethrough, the horizontal member also having an integral vertical tubular member extending therefrom centrally intermediate the ends thereof, the vertical member having a right-hand threaded bore therethrough, a lower plurality of evenly spaced apart reversible couplings adapted to be cast within the concrete foundation footings, the lower plurality of reversible couplings being disposed along the reinforcement bar within the footing such that the reinforcement bar passes through the smooth bores of the reversible couplings whereby the reversible couplings are retained on the reinforcement bar, the vertical member of the reversible couplings projecting upwardly from the reinforcement bar to extend slightly above the top surface of the footing;

a plurality of identical horizontal tie bars, each horizontal tie bar comprising an elongated metal rod having right-hand external threads formed on both ends thereof, a horizontal tie bar extending through the lateral holes in the rafter connectors, the horizontal tie bar also extending through the smooth bores of an upper plurality of evenly spaced apart T-shaped reversible couplings such that the reversible couplings' vertical member depends downwardly therefrom, each of the upper plurality of reversible couplings being positioned along the horizontal tie bar spaced directly above a corresponding coupling of the lower plurality of T-shaped reversible couplings;

a plurality of identical vertical upper tie bars, each upper tie bar comprising an elongated metal rod having an upper end with right-hand external threads formed thereon and a lower end with left-hand external threads formed thereon, the lower end also having LH marked thereon whereby a user may easily recognize the thread orientation of that end, the upper end of an upper tie bar being threadedly engaged with the downwardly depending threaded bore of each of the upper plurality of reversible T-shaped couplings such that the upper tie bars depend downwardly from the reversible couplings;

a plurality of identical vertical lower tie bars, each lower tie bar comprising an elongated metal rod having right-hand external threads formed on both ends thereof, the lower end of a lower tie bar being threadedly engaged with the upwardly projecting threaded bore of each of the lower plurality of T-shaped reversible couplings extending from the foundation footing such that the upper ends of the lower tie bars are in spaced facing relationship with the lower ends of corresponding upper tie bars;

a plurality of identical adjusting couplings, each adjusting coupling comprising an elongated metal hexagonal nut having an upper end with left-hand internal threads formed therein and a lower end with right-hand internal threads formed therein, the upper end also having UP8 marked thereon whereby the user may easily recognize the direction of thread orientation of that end, the upper end of an adjusting coupling being threadedly engaged with the lower end of each of the vertical upper tie bars, the lower end of an adjusting coupling being threadedly engaged with the upper end of each adjacent vertical lower tie bar whereby rotating the adjusting coupling in one direction relative the vertical tie bars draws the tie bar ends closer together for increasing tension on the tie bars whereas rotating the adjusting coupling in the other direction relative the vertical tie bars forces the tie bar ends farther apart for decreasing tension on the tie bars;

a plurality of identical metal T-shaped splicing couplings whereby two horizontal tie bars may be joined for increased length, each splicing coupling comprising a tubular horizontal member having a right-hand threaded bore therethrough, the horizontal member also having an integral vertical tubular member extending therefrom centrally intermediate the ends thereof, the vertical member having a right-hand threaded bore therethrough, the splicing coupling horizontal member being threadedly engaged at each end with the threaded end of a horizontal tie bar; and a plurality of identical metal T-shaped corner couplings whereby a vertical upper tie bar may be connected to a horizontal tie bar in confined locations adjacent closely spaced apart rafters, each corner coupling comprising a rectangular horizontal member having a smooth bore therethrough, the horizontal member also having an integral vertical tubular member extending therefrom centrally intermediate the ends thereof, the vertical member having a right-hand threaded bore therethrough, the horizontal member of a corner coupling being engaged with a horizontal tie bar such that the tie bar extends through the smooth bore of the horizontal member.

* * * * *